US012754111B2

(12) United States Patent
Koga

(10) Patent No.: US 12,754,111 B2
(45) Date of Patent: Oct. 6, 2026

(54) THERMAL ANALYSIS SYSTEM

(71) Applicant: Shimadzu Corporation, Kyoto (JP)

(72) Inventor: Yuko Koga, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 340 days.

(21) Appl. No.: 18/397,559

(22) Filed: Dec. 27, 2023

(65) Prior Publication Data

US 2024/0328912 A1 Oct. 3, 2024

(30) Foreign Application Priority Data

Mar. 31, 2023 (JP) ................................. 2023-058159

(51) Int. Cl.

| | |
|---|---|
| ***G01N 1/44*** | (2006.01) |
| ***G01N 5/00*** | (2006.01) |
| ***G01N 25/00*** | (2006.01) |
| ***G01N 30/02*** | (2006.01) |
| ***G01N 30/72*** | (2006.01) |

(52) U.S. Cl.

CPC ................. *G01N 1/44* (2013.01); *G01N 5/00* (2013.01); *G01N 25/00* (2013.01); *G01N 30/02* (2013.01); *G01N 30/72* (2013.01)

(58) Field of Classification Search

CPC .......... G01N 5/00; G01N 30/02; G01N 30/72; G01N 1/44; G01N 25/00

See application file for complete search history.

(56) References Cited

U.S. PATENT DOCUMENTS

| | | | | |
|---|---|---|---|---|
| 4,919,893 | A * | 4/1990 | Bandurski | G01N 30/12 422/78 |
| 2005/0112027 | A1* | 5/2005 | Arii | H01J 49/049 436/155 |
| 2012/0103068 | A1* | 5/2012 | Henderson | G01M 3/3254 73/40.7 |
| 2013/0298639 | A1* | 11/2013 | Blumm | G01N 25/00 73/25.01 |
| 2014/0326875 | A1* | 11/2014 | Asano | H01J 49/005 250/281 |
| 2016/0035553 | A1* | 2/2016 | Ogata | H01J 49/0418 118/726 |
| 2018/0299415 | A1* | 10/2018 | Cardin | G01N 30/54 |
| 2019/0265205 | A1* | 8/2019 | Spartz | G01N 1/4022 |
| 2021/0088485 | A1* | 3/2021 | Kinoshita | G01N 30/12 |
| 2021/0278379 | A1* | 9/2021 | Shibutani | G01N 30/7206 |
| 2022/0178803 | A1* | 6/2022 | Will | G01N 5/04 |

FOREIGN PATENT DOCUMENTS

| | | |
|---|---|---|
| JP | H06-300748 A | 10/1994 |

* cited by examiner

*Primary Examiner* — Helen C Kwok
(74) *Attorney, Agent, or Firm* — Muir Patent Law, PLLC

(57) ABSTRACT

A thermal analysis system capable of analyzing a sample gas generated from a sample in a heating unit of a thermogravimetric apparatus in a state in which an inside of the heating unit is in atmospheric pressure. A supply tube connects the inside of the heating unit of the thermogravimetric apparatus and an analyzer to supply a sample gas generated from the sample heated in the heating unit to the analyzer. A split tube is branched from a flow path between the inside of the heating unit and the supply tube to cause a part of the sample gas flowing from the inside of the heating unit toward the supply tube to flow out. A vacuum pump is in fluid communication with the split tube to depressurize in the inside of the heating unit.

11 Claims, 2 Drawing Sheets

THERMAL ANALYSIS SYSTEM

CROSS-REFERENCE TO RELATED APPLICATIONS

This application claims priority under 35 U.S.C. § 119 to Japanese Patent Application No. 2023-58159 filed on Mar. 31, 2023, the entire disclosure of which is incorporated herein by reference in its entirety.

BACKGROUND OF THE INVENTION

Field of the Invention

The present disclosure relates to a thermal analysis system for analyzing a sample gas generated from a sample heated in a heating unit of a thermogravimetric apparatus by an analyzer.

Description of the Related Art

The following description sets forth the inventor's knowledge of related art and problems therein and should not be construed as an admission of knowledge in the prior art.

In a thermogravimetric apparatus, a thermal analysis of a sample can be performed by heating a sample in a heating unit and measuring the change in weight of the sample during the heating process. A thermal analysis system is known in which a thermogravimetric apparatus of this type and an analyzer such as a gas chromatograph mass spectrometer are combined to perform an analysis of a sample gas generated from a sample heated in a heating unit of a thermogravimetric apparatus (see, for example, Patent Document 1 listed below).

PRIOR ART DOCUMENT

Patent Document

Patent Document 1: Japanese Unexamined Patent Application Publication No. H06-300748

Problems to be Solved by the Invention

When conducting an analysis using the thermal analysis system described above, a carrier gas is supplied to the inside of the heating unit of the thermogravimetric apparatus, and the sample gas generated from the sample in the heating unit is supplied to the analyzer together with a carrier gas. The inside of the heating unit of the thermogravimetric apparatus and the analyzer are connected by a supply tube, and the sample gas in the heating unit is supplied to the analyzer through the supply tube.

During the analysis, as the temperature in the heating unit rises, various reactions, such as, e.g., sublimation, evaporation, and oxidation reactions, occur in addition to decomposition reactions of the sample, resulting in changes in material properties, such as, e.g., changes in the mass of the sample. At this time, the volume change of the sample due to the pressure change in the heating unit may affect the physical changes and the chemical reactions of the sample. Therefore, it is preferable to maintain the pressure in the heating unit at atmospheric pressure during the analysis.

However, in the case of performing the analysis while supplying a carrier gas to the heating unit as described above, the inside of the heating unit is pressurized, which makes it difficult to perform the analysis in a state in which the inside of the heating unit is at atmospheric pressure.

SUMMARY OF THE INVENTION

The present invention has been made in view of the above-described circumstances. One of the objects of the present invention is to provide a thermal analysis system capable of analyzing a sample gas generated from a sample in a heating unit of a thermogravimetric apparatus in a state in which the inside of the heating unit is at atmospheric pressure.

Means for Solving the Problems

According to a first aspect of the present invention, a thermal analysis system for analyzing a sample gas generated from a sample heated in a heating unit of a thermogravimetric apparatus by an analyzer is provided with a supply tube, a split tube, and a vacuum pump. The supply tube connects the inside of the heating unit and the analyzer and is configured to supply a sample gas generated from the sample heated in the heating unit to the analyzer. The split tube branches from a flow path between the inside of the heating unit and the supply tube to cause a part of the sample gas that flows from the inside of the heating unit toward the supply tube to flow out. The vacuum pump is in fluid communication with the split tube to depressurize the inside of the heating unit.

Effects of the Invention

According to the first aspect of the present invention, by depressurizing the inside of the heating unit of the thermogravimetric apparatus using the vacuum pump, it is possible to analyze the sample gas generated from the sample in the heating unit in a state in which the inside of the heating unit is in an atmospheric pressure state.

BRIEF DESCRIPTION OF THE DRAWINGS

The preferred embodiments of the present invention are shown by way of example, and not limitation, in the accompanying FIGURES.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those skilled in the art based on these illustrated embodiments.

1: First Embodiment of Thermal Analysis System

Figure 1:
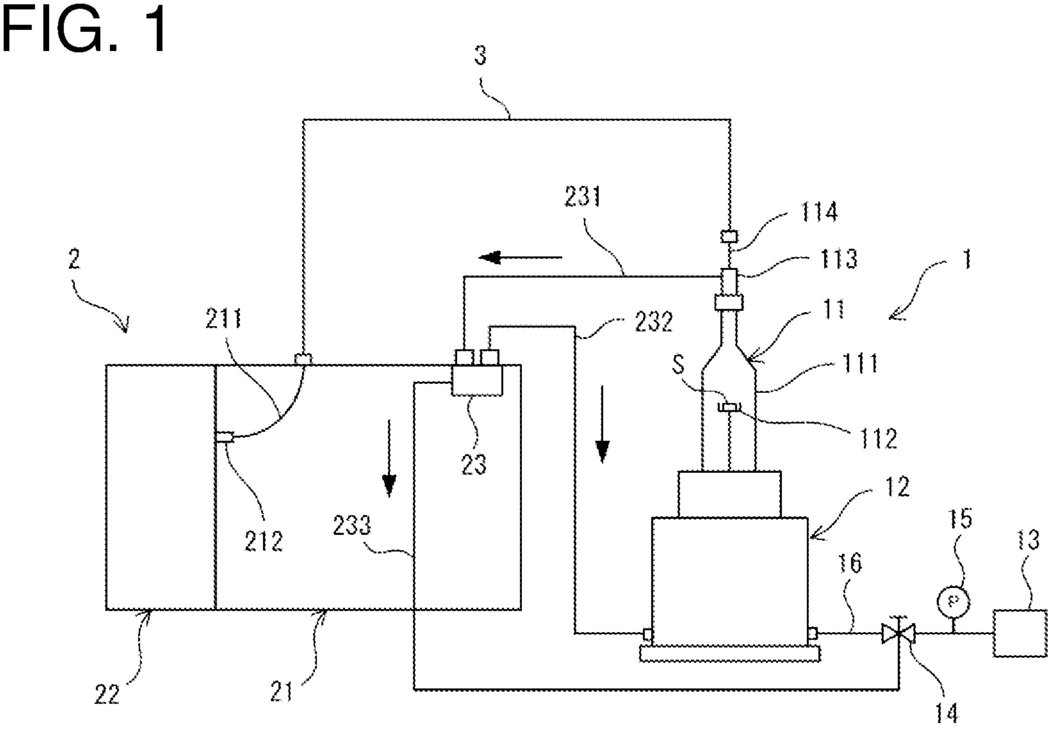
FIG. 1 is a schematic diagram showing a configuration example of a thermal analysis system according to a first embodiment of the present invention.

FIG. 1 is a schematic diagram showing a configuration example of a thermal analysis system according to a first embodiment of the present invention. This thermal analysis system is equipped with a thermogravimetric apparatus 1 and an analyzer 2. The operation of the thermogravimetric apparatus 1 and that of the analyzer 2 may be controlled by mutually different controllers, or the operation of the entire thermal analysis system may be controlled by a single controller. The controller is configured by a processor, such as, e.g., a central processing unit (CPU).

The thermogravimetric apparatus 1 is equipped with a heating unit 11, a balance part 12, a vacuum pump 13, an open/close valve 14, and a vacuum gauge 15. The heating unit 11 includes a furnace tube 111 and a sample stand 112. The furnace tube 111 is a hollow member, and a sample S can be placed on the sample stand 112 arranged in the furnace tube 111. The balance part 12 measures the weight of the sample S on the sample stand 112.

The furnace tube 111 has a shape with the bottom surface open and is configured to be movable in the vertical direction with respect to the balance part 12. In the state shown in FIG. 1, the bottom surface of the furnace tube 111 is in contact with the balance part 12, therefore, the inside of the furnace tube 111 is closed. When the furnace tube 111 is moved upward from the state shown in FIG. 1, the inside of the furnace tube 111 is exposed to the outside, and therefore, the sample S can be placed on or removed from the sample stand 112.

The vacuum pump 13 is in fluid communication with the inside of the heating unit 11 (the inside of the furnace tube 111) via a piping 16. The open/close valve 14 is provided in the middle portion of the piping 16 and can be switched between an open state allowing the passage of a gas in the piping 16 and a closed state blocking the passage of the gas in the piping 16. The vacuum gauge 15 is provided between the vacuum pump 13 and the open/close valve 14 in the piping 16 to measure the pressure in the piping 16.

When analyzing the sample S, the vacuum pump 13 is operated with the open/close valve 14 in the open state prior to the analysis to exhaust the air in the furnace tube 111 in the closed state. After that, a gas (e.g., an inert gas such as a helium gas) is supplied to the furnace tube 111, and the analysis of the sample S is performed while continuously supplying the gas into the furnace tube 111. During the analysis of the sample S, the inside of the furnace tube 111 is heated by a heater (not shown).

The analyzer 2 is, for example, a gas chromatograph mass spectrometer (GC-MS). The analyzer 2 is in fluid communication with the inside of the heating unit 11 (the inside of the furnace tube 111) of the thermogravimetric apparatus 1 via the supply tube 3 serving as a transfer line. The sample gas generated from the sample S heated in the heating unit 11 of the thermogravimetric apparatus 1 is supplied to the analyzer 2 via the supply tube 3, and the sample gas is analyzed by the analyzer 2. Note that, the analyzer 2 is not limited to a gas chromatograph mass spectrometer, but may be other devices, such as, e.g., a Fourier transform infrared spectrophotometer (FT-IR).

In the example shown in FIG. 1, the analyzer 2 is equipped with a gas chromatograph unit (GC unit 21) and a mass spectrometer unit (MS unit 22). The GC unit 21 is equipped with a column 211 to which the supply tube 3 is detachably connected. The column 211 is connected to the MS unit 22 via an interface 212. The sample gas that has passed through the column 211 is introduced into the MS unit 22 via the interface 212, and the mass analysis is performed in the MS unit 22. Note that during the mass analysis, the MS unit 22 is kept in a vacuum state.

The GC unit 21 is equipped with a flow controller 23 configured by, for example, an AFC (electronic flow controller). Connected to the flow controller 23 are a split tube

231, a purge tube 232, and a vent tube 233. The split tube 231 branches off from the flow path between the inside of the heating unit 11 of the thermogravimetric apparatus 1 and the supply tube 3.

Specifically, a branch tube 113 as a splitter is attached to the upper end of the furnace tube 111 of the heating unit 11. To the branch tube 113, in addition to the split tube 231, a piping 114 in fluid communication with the supply tube 3 is connected. Apart of the sample gas flowing from the inside of the furnace tube 111 toward the supply tube 3 flows out of the split tube 231, and the remaining sample gas is supplied to the supply tube 3 through the piping 114. The sample gas flowing into the split tube 231 flows into the flow controller 23. The inner diameter of the split tube 231 is larger than, for example, the inner diameter of the piping 114 and that of the supply tube 3.

All of the gas flowing from the split tube 231 into the flow controller 23 flows out of the vent tube 233. The purge tube 232 is connected to the thermogravimetric apparatus 1 and is in fluid communication with the inside of the heating unit 11 (the inside of the furnace tube 111). A gas is supplied to the purge tube 232 through the flow controller 23 from a gas cylinder and a centralized piping, both of which are not shown in the FIGURES. During the analysis by the thermogravimetric apparatus 1, a gas is continuously supplied to the inside of the furnace tube 111 from the purge tube 232.

The flow controller 23 can control the flow rate and the pressure. Specifically, the flow rate of the gas flowing into the purge tube 232 (the gas supplied to the furnace tube 111) can be controlled to a set flow rate by the flow controller 23. Further, the pressure in the furnace tube 111 can be controlled via the split tube 231, and the sample gas flows out to the vent tube 233 at a flow rate corresponding to the pressure control.

The vent tube 233 is in fluid communication with the vacuum pump 13. Specifically, the vent tube 233 is connected to the piping 16 of the thermogravimetric apparatus 1, and therefore, the vent tube 233 is in fluid communication with the vacuum pump 13 via the piping 16. In the example shown in FIG. 1, the vent tube 233 is connected to the middle portion of the piping 16 via the open/close valve 14. In this case, for example, the open/close valve 14 may be configured by a three-way valve. However, it may be configured such that the vent tube 233 is connected to the middle portion of the piping 16 via a valve different from the open/close valve 14.

With the above-described configuration, the vacuum pump 13 is in fluid communication with the split tube 231 via the vent tube 233. Therefore, by operating the vacuum pump 13, the inside of the heating unit 11 (the inside of the furnace tube 111) connected to the split tube 231 can be depressurized to atmospheric pressure.

The flow rate of the gas flowing out into the purge tube 232 (the gas supplied into the furnace tube 111) is controlled by the flow controller 23 to a set flow rate of, for example, 50 ml/min to 200 ml/min. On the other hand, the flow rate of the sample gas that can be supplied to the MS unit 22 of the analyzer 2 (gas chromatograph mass spectrometer) through the supply tube 3 is about 10 ml/min at maximum. This is the flow rate of the sample gas flowing from the inside of the furnace tube 111 to the MS unit 22 through the supply tube 3 due to the pressure difference when the inside of the furnace tube 111 is at atmospheric pressure, and the MS unit 22 is in a vacuum state.

2. Modification of First Embodiment

A vacuum pump for depressurizing the inside of the heating unit 11 (the inside of the furnace tube 111) may be provided separately from the vacuum pump 13 of the thermogravimetric apparatus 1. In this case, the vent tube 233 may be connected to a vacuum pump different from the vacuum pump 13 of the thermogravimetric apparatus 1.

The flow controller 23 is not limited to the configuration provided to the GC unit 21 of the analyzer 2, but may be provided separately from the analyzer 2. In other words, instead of the configuration in which the pressure in the heating unit 11 is controlled using the flow controller 23 provided to the GC unit 21 of the analyzer 2, a flow controller to control the pressure in the heating unit 11 may be provided separately.

3: Second Embodiment of Thermal Analysis System

Figure 2:
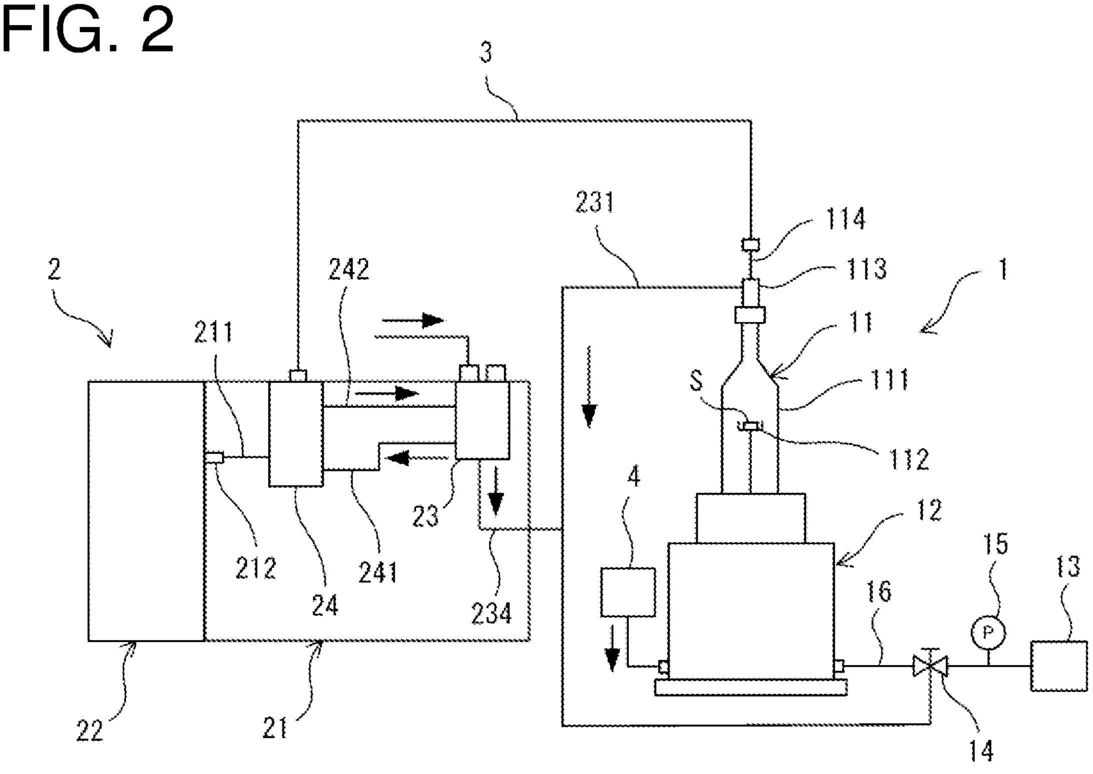
FIG. 2 is a schematic diagram showing a configuration example of a thermal analysis system according to a second embodiment of the present invention.

FIG. 2 is a schematic diagram showing a configuration example of a thermal analysis system according to a second embodiment of the present invention. In this thermal analysis system, the configuration of the GC unit 21 of the analyzer 2 and the piping connections in the thermogravimetric apparatus 1 are different from those in the first embodiment, and the other configurations are similar to those in the first embodiment. For this reason, the same configuration as in the first embodiment is shown with the same symbols in the FIGURES, and the detailed explanations thereof will be omitted.

In the example shown in FIG. 2, the GC unit 21 of the analyzer 2 is equipped with a sample vaporization chamber 24. A supply tube 3 is detachably connected to the sample 24. A supply tube 3 is detachably connected to the sample vaporization chamber 24. The supply tube 3 is in fluid communication with the column 211 via the sample vaporization chamber 24, and the sample gas supplied from the supply tube 3 flows into the column 211 after being mixed with the carrier gas in the sample vaporization chamber 24. By supplying the carrier gas in the sample vaporization chamber 24, the sample gas can be diluted by the carrier gas in the sample vaporization chamber 24 and supplied to the column 211.

The GC unit 21 is equipped with a flow controller 23 configured by, for example, an AFC (electronic flow controller). The sample vaporization chamber 24 is supplied with the carrier gas (inert gas, such as, e.g., a helium gas) from the flow controller 23 through the introduction tube 241. The flow controller 23 and the sample vaporization chamber 24 are connected not only by the introduction tube 241 but also by the purge tube 242.

The flow controller 23 can control the flow rate and the pressure. Specifically, the pressure in the sample vaporization chamber 24 can be controlled via the introduction tube 241, and the sample gas in the sample vaporization chamber 24 flows out to the purge tube 242 at a flow rate corresponding to the pressure control. Further, the flow controller 23 is connected to the vent tube 234 in fluid communication with the purge tube 242, and the sample gas flowing from the sample vaporization chamber 24 into the flow controller 23 via the purge tube 242 flows out of the vent tube 234. The flow rate of the sample gas flowing out of the vent tube 234 can be controlled to a set flow rate by the flow controller 23.

The vent tube 234 is in fluid communication with the vacuum pump 13. Specifically, the vent tube 234 is connected to the middle point of the piping 16 of the thermogravimetric apparatus 1, and therefore, the vent tube 234 is in fluid communication with the vacuum pump 13 via the piping 16. In the example shown in FIG. 2, the vent tube 234 is connected to the middle portion of the piping 16 via the open/close valve 14. In this case, the open/close valve 14 may be configured by, for example, a three-way valve. However, it may be configured such that the vent tube 234 is connected to the middle portion of the piping 16 via a valve different from the open/close valve 14.

Further, a split tube 231, which branches off from the flow path between the inside of the heating unit 11 of the thermogravimetric apparatus 1 and the supply tube 3, is connected to the middle portion of the vent tube 234. Therefore, by operating the vacuum pump 13, the inside of the heating unit 11 (the inside of the furnace tube 111) in fluid communication with the split tube 231 can be depressurized. Note that the flow rate of the sample gas flowing out of the flow path between the inside of the heating unit 11 and the supply tube 3 into the split tube 231 is determined by the ratio of the resistance of the split tube 231 to that of the supply tube 3.

The vacuum pump 13 is in fluid communication with the flow controller 23 via the vent tube 234 and is in fluid communication with the inside of the heating unit 11 (the inside of the furnace tube 111) from the flow controller 23 via the sample vaporization chamber 24 and the supply tube 3. Therefore, by controlling the pressure in the sample vaporization chamber 24 with the flow controller 23, the pressure in the heating unit 11 (the inside of the furnace tube 111) can be controlled to atmospheric pressure via the sample vaporization chamber 24 and the supply tube 3.

Unlike the example shown in FIG. 1, the example shown in FIG. 2 is not configured such that a sample gas is supplied to the thermogravimetric apparatus 1 from the flow controller 23, but a carrier gas is supplied to the thermogravimetric apparatus 1 from a separately installed gas supply unit 4. The gas supply unit 4 is configured by, for example, an APC (detector electronic flow controller) and supplies a carrier gas into the heating unit 11 (into the furnace tube 111) at an arbitrarily set flow rate. During the analysis by the thermogravimetric apparatus 1, the carrier gas is continuously supplied to the inside of the furnace tube 111 from the gas supply unit 4.

The flow rate of the carrier gas (the carrier gas supplied to the inside of the furnace tube 111) supplied from the gas supply unit 4 is controlled at a set flow rate of, for example, 50 ml/min to 200 ml/min. On the other hand, the flow rate of the sample gas that can be supplied to the MS unit 22 of the analyzer 2 (gas chromatograph mass spectrometer) through the supply tube 3 is about 10 ml/min at maximum. This is the flow rate of the sample gas flowing from the inside of the furnace tube 111 to the MS unit 22 through the supply tube 3 due to the pressure difference when the inside of the furnace tube 111 is at atmospheric pressure, and the MS unit 22 is in a vacuum state.

4. Control of Thermal Analysis System in Second Embodiment

In the thermal analysis system shown in FIG. 2, at the end of the analysis, the inside of the furnace tube 111 is at atmospheric pressure, while the MS unit 22 is in a vacuum state. When the furnace tube 111 is moved upward, the inside of the furnace tube 111 is exposed to the outside in this state. Therefore, the air flowing into the furnace tube 111 will flow into the MS unit 22 through the supply tube 3 and the sample vaporization chamber 24. To prevent this air inflow into the MS unit 22, the following control is performed.

Specifically, before the inside of the furnace tube 111 is exposed to the atmosphere, it is controlled by the flow controller 23 so that the inside of the sample vaporization chamber 24 becomes positive in pressure. With this, the pressure in the sample vaporization chamber 24 becomes higher than that in the furnace tube 111, thus preventing air from flowing into the sample vaporization chamber 24 side from the inside of the furnace tube 111 through the supply tube 3. Note that the "before the inside of the furnace tube 111 is exposed to the atmosphere" is, for example, before taking out the sample S by opening the inside of the furnace tube 111 after completion of the analysis, and the control described above may be performed at the timing of analysis completion, or at another time.

5. Modification of Second Embodiment

A vacuum pump for depressurizing the inside of the heating unit 11 (the inside of the furnace tube 111) may be provided separately from the vacuum pump 13 of the thermogravimetric apparatus 1. In this case, the vent tube 234 may be connected to a vacuum pump different from the vacuum pump 13 of the thermogravimetric apparatus 1.

The split tube 231, which branches off from the flow path between the inside of the heating unit 11 of the thermogravimetric apparatus 1 and the supply tube 3, does not have to be connected to the middle portion of the vent tube 234. In this case, the split tube 231 may be connected to a vacuum pump different from the vacuum pump 13 of the thermogravimetric apparatus 1.

The flow controller 23 is not limited to the configuration of being equipped to the GC unit 21 of the analyzer 2, but may be provided separately from the analyzer 2. In other words, instead of a configuration in which the pressure in the heating unit 11 is controlled using the flow controller 23 equipped to the GC unit 21 of the analyzer 2, a flow controller to control the pressure in the heating unit 11 may be equipped separately.

The gas supply unit 4 is not limited to the configuration of being equipped separately from the analyzer 2, but may be configured by a flow controller, such as, e.g., an APC, equipped to the analyzer 2.

6. Aspects

It would be understood by those skilled in the art that the exemplary embodiments described above are specific examples of the following aspects.

(Item 1)

A thermal analysis system according to one aspect of the present invention is a thermal analysis system for analyzing a sample gas generated from a sample heated in a heating unit of a thermogravimetric apparatus by an analyzer, the thermal analysis system comprising:

- a supply tube connecting an inside of the heating unit and the analyzer, the supply tube being configured to supply the sample gas to the analyzer;
- a split tube branching from a flow path between the inside of the heating unit and the supply tube, the split tube being configured to cause a part of the sample gas that flows from the inside of the heating unit toward the supply tube to flow out; and
- a vacuum pump in fluid communication with the split tube, the vacuum pump being configured to depressurize the inside of the heating unit.

According to the thermal analysis system as recited in the above-described Item 1, by depressurizing the inside of the heating unit of the thermogravimetric apparatus using the vacuum pump, it is possible to analyze the sample gas generated from the sample in the heating unit in a state in which the inside of the heating unit is at atmospheric pressure.

(Item 2)

In the thermal analysis system as recited in the above-described Item 1, it may be configured to comprise a flow controller connected to the split tube, the flow controller being configured to control pressure of the inside of the heating unit via the split tube.

According to the thermal analysis system as recited in the above-described Item 2, it is possible to easily set the inside of the heating unit to atmospheric pressure using the flow controller.

(Item 3)

In the thermal analysis system as recited in the above-described Item 2, it may be configured to further comprise

- a vent tube connected to the flow controller, the vent tube being configured to cause the sample gas that flows into the flow controller from the split tube to flow out, wherein the vent tube is in fluid communication with the vacuum pump.

According to the thermal analysis system as recited in the above-described Item 3, the pressure in the heating unit can be controlled via the split tube, and the sample gas flows out into the vent tube at a flow rate corresponding to the pressure control.

(Item 4)

In the thermal analysis system as recited in the above-described Item 3, it may be configured to further comprise:

- a purge tube connected to the flow controller, the purge tube being in fluid communication with the inside of the heating unit.

According to the thermal analysis system as recited in the above-described Item 4, it is possible to control the flow rate of the gas supplied from the purge tube into the heating unit to a set flow rate by a flow controller.

(Item 5)

In the thermal analysis system as recited in the above-described Item 1, it may be configured to further comprise:

- a sample vaporization chamber equipped to the analyzer, the sample vaporization chamber being configured to mix a carrier gas with the sample gas supplied from the supply tube; and
- a flow controller connected to the sample vaporization chamber, the flow controller being configured to control pressure of the inside of the heating unit via the sample vaporization chamber and the supply tube.

According to the thermal analysis system as recited in the above-described Item 5, by controlling the pressure in the sample vaporization chamber using a flow controller, it is possible to easily set the inside of the heating unit to atmospheric pressure.

(Item 6)

In the thermal analysis system as recited in the above-described Item 5, it may be configured to further comprise:

- a vent tube connected to the flow controller, the vent tube being configured to cause the sample gas that flows into the flow controller from the sample vaporization chamber to flow out, wherein the vent tube is in fluid communication with the vacuum pump.

According to the thermal analysis system as recited in the above-described Item 6, the pressure in the heating unit can be controlled via the sample vaporization chamber, and the sample gas flows out to the vent tube at a flow rate corresponding to the pressure control.

(Item 7)

In the thermal analysis system as recited in the above-described Item 6, it may be configured such that the split tube is in fluid communication with the vent tube.

According to the thermal analysis system as recited in the above-described Item 7, it is possible to depressurize the inside of the heating unit via the split tube while controlling the pressure in the heating unit via the sample vaporization chamber using a single vacuum pump.

(Item 8)

In the thermal analysis system as recited in above-described Item 5, it may be configured to further comprise:

a gas supply unit configured to supply the carrier gas to the inside of the heating unit.

According to the thermal analysis system as recited in the above-described Item 8, the carrier gas can be supplied to the inside of the heating unit from the gas supply unit provided separately from the analyzer, so that the analyzer and the thermogravimetric apparatus can be easily disconnected by simply removing the supply tube.

(Item 9)

In the thermal analysis system as recited in the above-described Item 5, it may be configured such that the flow controller performs control such that an inside of the sample vaporization chamber becomes positive in pressure before the inside of the heating unit is exposed to atmosphere.

According to the thermal analysis system as recited in the above-described Item 9, by controlling such that the inside of the sample vaporization chamber becomes positive in pressure by the flow controller before the inside of the heating unit is exposed to the atmosphere, the pressure in the sample vaporization chamber becomes higher than that in the heating unit. This prevents air from flowing into the sample vaporization chamber side from the inside of the heating unit through the supply tube.

(Item 10)

In the thermal analysis system as recited in the above-described Item 2 or Item 5, it may be configured such that the flow controller is equipped to the analyzer.

According to the thermal analysis system as recited in the above-described Item 10, the flow controller equipped to the analyzer can be used to depressurize the heating unit, so there is no need to provide a flow controller separately.

It should be understood that the terms and expressions used herein are used for explanation and have no intention to be used to construe in a limited manner, do not eliminate any equivalents of features shown and mentioned herein, and allow various modifications falling within the claimed scope of the present invention.

While illustrative embodiments of the present invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A thermal analysis system for analyzing a sample gas generated from a sample heated in a heating unit of a thermogravimetric apparatus by an analyzer, the thermal analysis system comprising:

a supply tube connecting an inside of the heating unit and the analyzer, the supply tube being configured to supply the sample gas to the analyzer;

a split tube branching from a flow path between the inside of the heating unit and the supply tube, the split tube being configured to cause a part of the sample gas that flows from the inside of the heating unit toward the supply tube to flow out; and a vacuum pump in fluid communication with the split tube, the vacuum pump being configured to depressurize the inside of the heating unit.

2. The thermal analysis system as recited in claim 1, further comprising:

a flow controller connected to the split tube, the flow controller being configured to control pressure of the inside of the heating unit via the split tube.

3. The thermal analysis system as recited in claim 2, further comprising:

a vent tube connected to the flow controller, the vent tube being configured to cause the sample gas that flows into the flow controller from the split tube to flow out, wherein the vent tube is in fluid communication with the vacuum pump.

4. The thermal analysis system as recited in claim 3, further comprising:

a purge tube connected to the flow controller, the purge tube being in fluid communication with the inside of the heating unit.

5. The thermal analysis system as recited in claim 1, further comprising:

a sample vaporization chamber equipped to the analyzer, the sample vaporization chamber being configured to mix a carrier gas with the sample gas supplied from the supply tube; and a flow controller connected to the sample vaporization chamber, the flow controller being configured to control pressure of the inside of the heating unit via the sample vaporization chamber and the supply tube.

6. The thermal analysis system as recited in claim 5, further comprising:

a vent tube connected to the flow controller, the vent tube being configured to cause the sample gas that flows into the flow controller from the sample vaporization chamber to flow out, wherein the vent tube is in fluid communication with the vacuum pump.

7. The thermal analysis system as recited in claim 6, wherein the split tube is in fluid communication with the vent tube.

8. The thermal analysis system as recited in claim 5, further comprising:

a gas supply unit configured to supply the carrier gas to the inside of the heating unit.

9. The thermal analysis system as recited in claim 5, wherein the flow controller performs control such that an inside of the sample vaporization chamber becomes positive in pressure before the inside of the heating unit is exposed to atmosphere.

10. The thermal analysis system as recited in claim 2, wherein the flow controller is equipped to the analyzer.

11. The thermal analysis system as recited in claim 5, wherein the flow controller is equipped to the analyzer.

* * * * *